United States Patent [19]

Wolfe

[11] 4,249,108
[45] Feb. 3, 1981

[54] LAMG ALUMINATE PHOSPHORS ACTIVATED BY EUROPIUM AND LAMPS INCORPORATING SAME

[75] Inventor: Robert W. Wolfe, Wysox, Pa.

[73] Assignee: GTE Products Corporation, Stamford, Conn.

[21] Appl. No.: 99,064

[22] Filed: Nov. 30, 1979

[51] Int. Cl.$^3$ .............................................. C09K 11/46
[52] U.S. Cl. ............................. 313/486; 252/301.4 R
[58] Field of Search .................. 252/301.4 R; 313/486

[56] References Cited

U.S. PATENT DOCUMENTS 4,161,457  7/1979  Takahashi et al. ........... 252/301.4 R

FOREIGN PATENT DOCUMENTS 7214862  5/1974  Netherlands .

OTHER PUBLICATIONS

Stevels et al., "J. Electrochem Soc.", vol. 123, No. 5, 1976, pp. 691–697.

*Primary Examiner*—Jack Cooper
*Attorney, Agent, or Firm*—John C. Fox

[57] ABSTRACT

A blue emitting La Mg aluminate phosphor activated by Eu and having a multiphase structure, exhibits improved brightness over prior art single phase compositions, and also exhibits high maintenance, making such phosphor useful either alone or in combination with other phosphors in fluorescent lamps.

4 Claims, 3 Drawing Figures

LAMG ALUMINATE PHOSPHORS ACTIVATED BY EUROPIUM AND LAMPS INCORPORATING SAME

BACKGROUND

This invention relates to aluminate phosphors, and more particularly relates to blue-emitting LaMg aluminate phosphors activated by europium, and to fluorescent lamps incorporating them.

The Beta-alumina-type hexagonal magnetoplumbite structure was discovered in the $La_2O_3$-$Al_2O_3$ binary system for the compound $LaAl_{11}O_{18}$, and the compound was found to have a solid solution region for ratios of $La_2O_3$ to $Al_2O_3$ from about 1:10 to 1:12. R. S. Roth and S. Hasko, J. American Ceramic Society, Vol. 41, (1958), p. 146. Fluorescence of $La_2O_3 \cdot 11Al_2O_3$ activated by Eu and Mn was published by M. Tamatani in 1974. (Japanese Journ. of App. Phys., Vol. 13, No. 6, June, 1974, p. 950-956).

In U.S. patent application Ser. No. 509,438, assigned to the present assignee, R. W. Wolfe discloses luminescent mixed alkaline earth cation aluminates activated by Eu alone or with Mn, for example, Ba Mg aluminate activated by Eu.

In Netherlands Pat. No. 7,214,862, Verstegen et al. disclose luminescent ternary aluminates and gallates exhibiting a hexagonal crystal structure. The host compound $LaMgAl_{11}O_{19}$ is disclosed as having the hexagonal or magneto plumbite structure and as falling within area "YSM" of the ternary diagram of FIG. 1 of the patent. Example No. 85 of the patent sets forth the composition

having intensity maxima of luminescence at 452 and 515 nanometers.

SUMMARY OF THE INVENTION

In accordance with the invention, it has been discovered that certain blue-emitting Eu-activated phosphor compositions within the $La_2O_3$-MgO-$Al_2O_3$ system, although lying within a region of the composition diagram remote from the single phase magneto plumbite $LaMgAl_{11}O_{19}$ and $LaAl_{11}O_{18}$ compositions, nevertheless exhibit optimum brightnesses upon ultraviolet excitation. The compositions of the invention are comprised of at least two of the phases; magneto plumbite, alpha-alumina and spinel, and fall within the diamond shaped area DEFG of the ternary diagram for $La_2O_3$-MgO-$Al_2O_3$ of FIG. 1.

The blue-emitting phosphor compositions of the invention are useful either alone or in combination with one or more other phosphors in fluorescent lamps.

BRIEF DESCRIPTION OF THE DRAWING

FIG. 3 is a plan view of a fluorescent lamp, partly cut away, showing a fluorescent layer incorporating a luminescent phosphor composition of the invention.

DETAILED DESCRIPTION OF THE INVENTION

Figure 1:
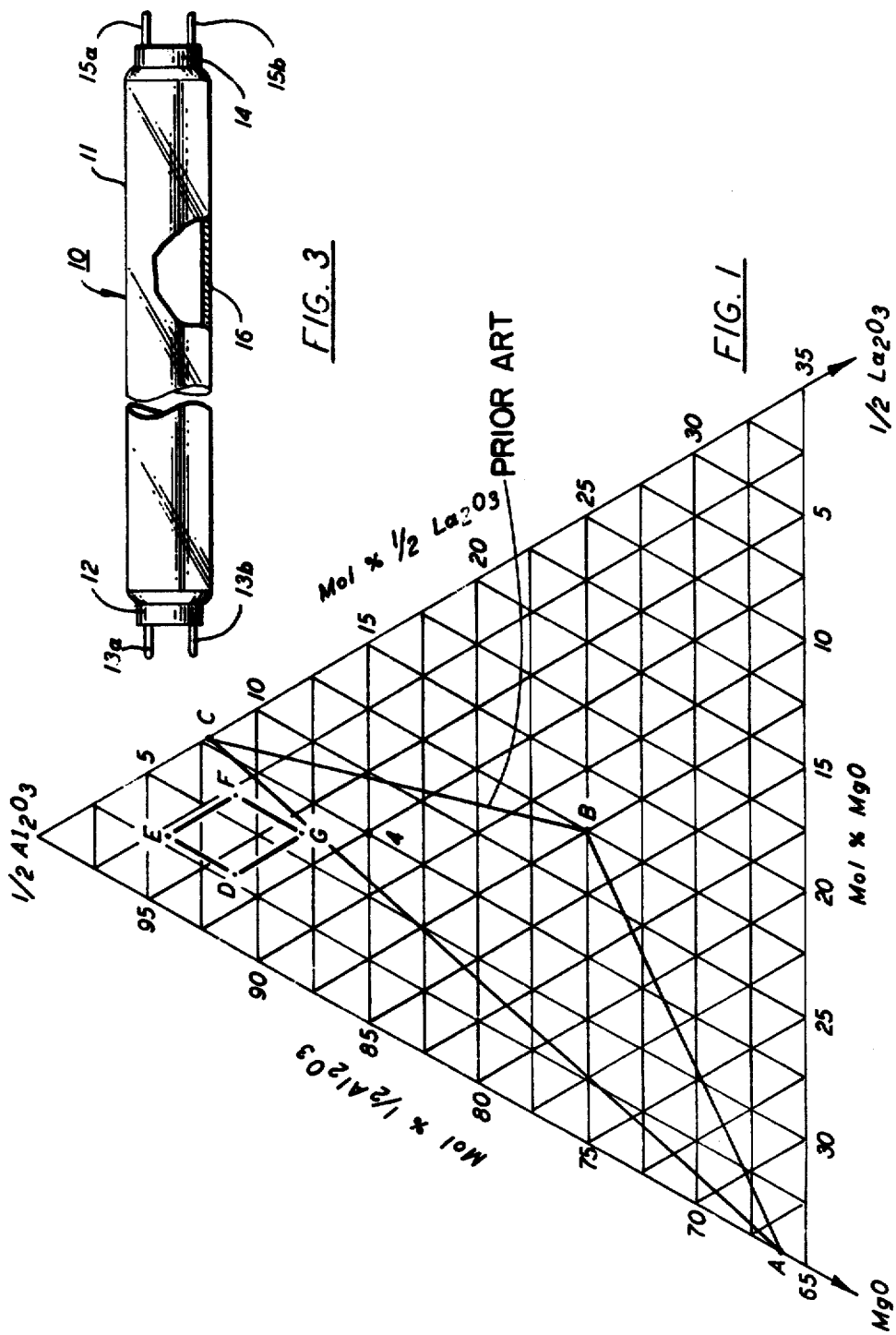
FIG. 1 is a portion of the ternary diagram for $La_2O_3$-MgO-$Al_2O_3$, showing regions for prior art compositions and compositions of the invention having superior brightnesses upon ultraviolet excitation.

Referring now to FIG. 1, which is a portion of a ternary diagram for the $La_2O_3$-MgO-$Al_2O_3$ system, there is shown region ABC, labeled "Prior Art", corresponding to region YSM of FIG. 1 of the Verstegen patent discussed above and encompassing Eu-activated host compositions having a single phase hexagonal magnetoplumbite crystal structure. Also shown is region DEFG, encompassing the multiphase Eu-activated host compositions of this invention, exhibiting improved brightness of UV-excited luminescent emission. Region DEFG may also be described by the formula

where
 $x = 0.351$ to $0.750$ and
 $y = 0.351$ to $0.750$

The amount of Eu activator is not critical and may range from 2 to 20 mole %, or 0.02 to 0.20 moles per mole of host, but is preferably kept within the range 0.025 to 0.125 moles per mole of host.

Figure 2:
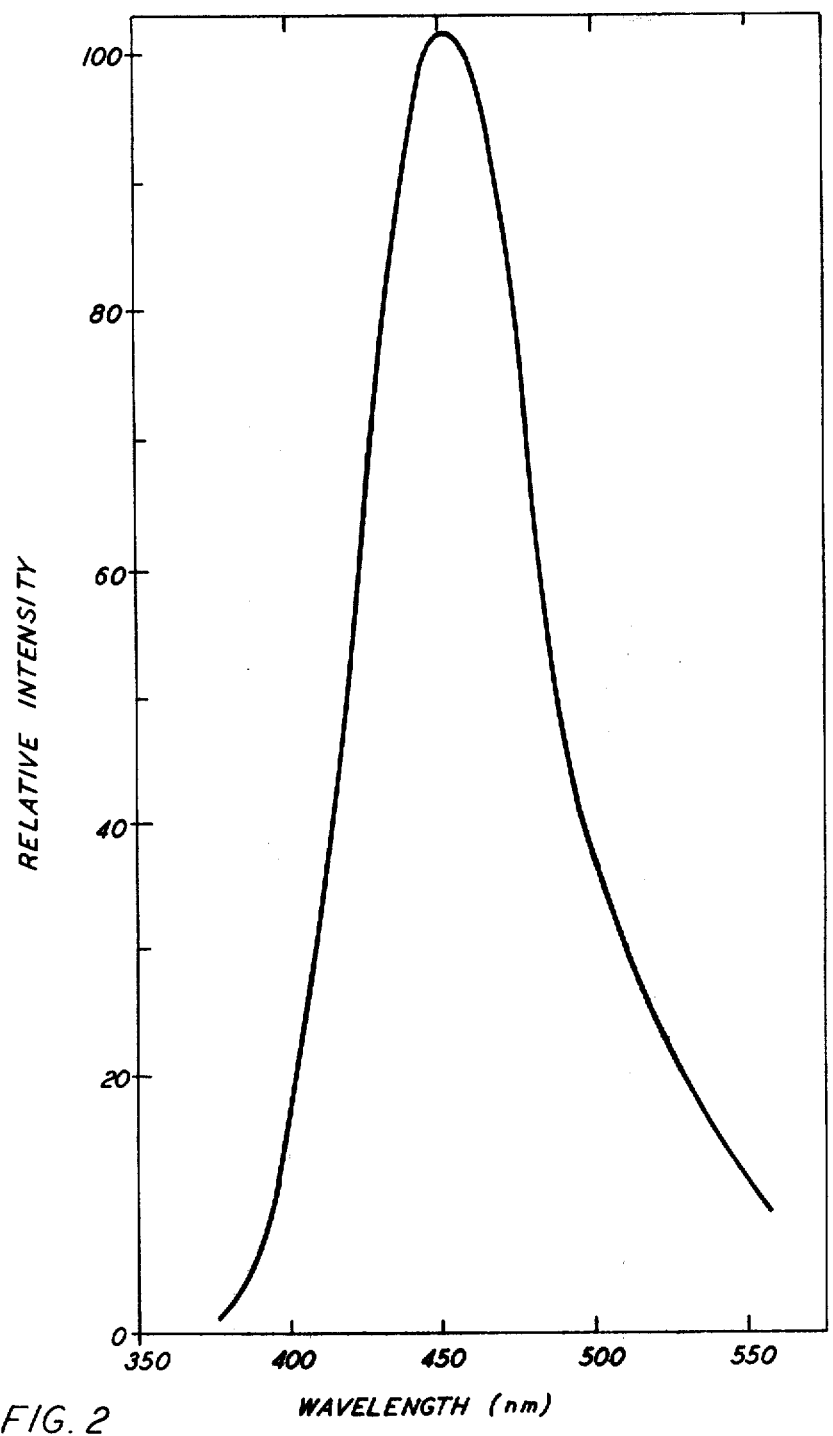
FIG. 2 is a graph of relative intensity (arbitrary units) of luminescent emission versus wavelength of emission in nanometers for a composition of the invention.

When activated with divalent Eu, the host compositions become brilliant blue phosphors, which upon UV excitation exhibit luminescent emissions peaking in intensity at about $445 \pm 5$ nanometers with a peak intensity halfwidth of about $75 \pm 5$ nanometers. FIG. 2 is a portion of the emission spectrum of a composition of the invention (composition No. 2 of the Example), showing the emission peak.

FIG. 3 is a plan view of a fluorescent lamp 10 of a conventional type, including glass envelope 11, end caps 12 and 14, with protruding connector pins 13a and b and 15a and b, a luminescent layer 16 coating the inside surface of the envelope 11. A fill gas comprising Ar and Hg atoms is present inside envelope 11. The layer 16 incorporates a Eu-activated luminescent composition from area DEFG of FIG. 1.

The compositions of the invention may be prepared readily by blending the required amounts of appropriate starting materials and firing in a reducing atmosphere at an elevated temperature for a modest time interval. Time, temperature and reducing atmosphere are not critical, but a mixture of nitrogen and hydrogen or hydrogen are preferred, a temperature range from 1500° C. to 1650° C. is preferred, and a time of from 1 to 5 hours is preferred. The particular starting materials are not critical. Preferred are $Al(OH)_3$, MgO, $La_2O_3$ and $Eu_2O_3$.

EXAMPLE I

A mixture of starting materials of
 1.531 grams $La_2O_3$
 0.378 grams MgO
 13.200 grams $Al(OH)_3$
 0.135 grams $Eu_2O_3$
was fired at 1550° C. for four hours in a reducing atmosphere of 75 vol. % $H_2$, 25 vol. % $N_2$. The resulting phosphor had the approximate molar formulation:

and comprised about 80 percent magneto plumbite phase, 20 percent alpha alumina phase, and under UV excitation luminesced bright blue. A portion of the emission spectrum is shown in FIG. 2.

EXAMPLE II

Using the procedure of Example I, several phosphor samples were prepared having the compositions shown in Table I and FIG. 1. Phase assemblages obtained by x-ray diffraction analysis, along with relative brightnesses obtained by plaque measurements of phosphor powder excited with 254 nm radiation are also shown in the Table.

EXAMPLE III

Using the procedure of Example I, a phosphor composition was prepared having the approximate molar formulation:

$$La_{0.750}Mg_{0.750}Al_{11}O_{18.4}$$

The phosphor was incorporated into a standard commercial-type 40 watt fluorescent lamp. After 100 hours of lamp operation, the lamp showed 99.1% maintenance, where maintenance is defined by:

$$\frac{\text{final light output}}{\text{initial light output}} \times 100$$

TABLE I

Composition, Relative Brightness, and Phase Assemblages For Points Shown in FIG. 1

| No. In FIG. 1 | Composition (Mol %) $\frac{1}{2}La_2O_3$ | MgO | $\frac{1}{2}Al_2O_3$ | Host Molar Formula | Relative Brightness | Phase Assemblage (percent)* |
|---|---|---|---|---|---|---|
| 1 | 3.75 | 3.75 | 92.5 | $La_{.445}Mg_{.445}Al_{11}O_{17.6}$ | 97 | 65A, 35 a |
| 2 | 5 | 5 | 90 | $La_{.611}Mg_{.611}Al_{11}O_{18.0}$ | 100 | 80A, 20 a |
| 3 | 6.0 | 6.0 | 88.0 | $La_{.750}Mg_{.750}Al_{11}O_{18.5}$ | 98 | 85A, 5 a, 10S |
| 4 | 7.69 | 7.69 | 85 | $LaMgAl_{11}O_{19}$ | 95 | 100A |

*Phases detected by x-ray diffraction. Relative amounts based on relative peak heights and are approximate.
a = alpha alumina,
A = magneto plumbite,
S = spinel.

It may be seen from Table I and FIG. 1 that compositions 1, 2 and 3 of the invention exhibit relative brightnesses of 97, 100 and 98 percent, respectively, while prior art composition 4 exhibits only 95 percent relative brightness. It is also seen that compositions 1, 2 and 3 all contain the phases magneto plumbite and alpha alumina, and composition 3 additionally contains spinel. In contrast, the prior art composition 4 is entirely magneto plumbite.

While there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

A blue emitting LaMg aluminate phosphor activated by Eu and having a multiphase structure, exhibits improved brightness over prior art single phase compositions, and also exhibits high maintenance, making such phosphor useful either alone or in combination with other phosphors in fluorescent lamps.

I claim:

1. A blue-emitting divalent europium activated lanthanum magnesium aluminate luminescent phosphor composition exhibiting a multiphase structure of either magneto plumbite and alpha alumina phases or magneto plumbite, alpha alumina and spinel phases and having the molar formula of $$La_xMg_yAl_{11}O_{16.5+y+(3x/2)}$$

where x lies between 0.351 and 0.750 and y lies between 0.351 and 0.750; said phosphor composition exhibiting a greater brightness than the corresponding divalent europium activated lanthanum magnesium aluminate luminescent phosphor composition having the molar formula $LaMgA_{11}O_{19}$.

2. The composition of claim 1 wherein the europium activator is present in the amount of about 0.02 to 0.20 moles per mole of host.

3. The composition of claim 2 wherein the europium activator is present in the amount of from 0.025 to about 0.125 moles per mole of host.

4. A fluorescent lamp including the luminescent phosphor composition of claim 1.

* * * * *